US009862163B2

(12) United States Patent
Grau et al.

(10) Patent No.: US 9,862,163 B2
(45) Date of Patent: Jan. 9, 2018

(54) SINTERED BORON NITRIDE BODY AND METHOD FOR PRODUCING A SINTERED BORON NITRIDE BODY

(71) Applicant: Kennametal Inc., Latrobe, PA (US)

(72) Inventors: Rudolf K. Grau, Neustadt an der Aisch (DE); Rodrigue N. Yappi, Fussen (DE); Hubert J. Schweiger, Fussen (DE)

(73) Assignee: KENNAMETAL INC., Latrobe, PA (US)

( * ) Notice: Subject to any disclaimer, the term of this patent is extended or adjusted under 35 U.S.C. 154(b) by 350 days.

(21) Appl. No.: 14/549,722

(22) Filed: Nov. 21, 2014

(65) Prior Publication Data

US 2015/0147520 A1    May 28, 2015

(30) Foreign Application Priority Data

Nov. 27, 2013    (DE) .................. 10 2013 224 308

(51) Int. Cl.
| | | |
|---|---|---|
| *C01B 21/064* | (2006.01) | |
| *C04B 35/593* | (2006.01) | |

(Continued)

(52) U.S. Cl.
CPC ............ *B32B 3/12* (2013.01); *B32B 3/00* (2013.01); *B32B 7/00* (2013.01); *B32B 7/02* (2013.01); *B32B 9/00* (2013.01); *B32B 9/04* (2013.01); *B32B 19/00* (2013.01); *B32B 19/04* (2013.01); *C04B 35/583* (2013.01); *C04B 35/593* (2013.01); *B32B 2264/00* (2013.01); *B32B 2264/10* (2013.01); *B32B 2264/104* (2013.01); *B32B 2307/30* (2013.01); *B32B 2307/302* (2013.01); *B32B 2475/00* (2013.01); *C04B 2235/604* (2013.01); *Y10T 428/24165* (2015.01)

(58) Field of Classification Search
None
See application file for complete search history.

(56) References Cited

U.S. PATENT DOCUMENTS

| | | | |
|---|---|---|---|
| 3,660,027 A | 5/1972 | Mandorf, Jr. et al. | |
| 3,673,118 A | 6/1972 | Mandorf, Jr. et al. | |

(Continued)

FOREIGN PATENT DOCUMENTS

| | | | | |
|---|---|---|---|---|
| GB | 1521788 A | * | 8/1978 | ........... C04B 35/583 |
| JP | 04224173 A | * | 8/1992 | |
| JP | 2001348276 A | | 12/2001 | |

OTHER PUBLICATIONS

Machine translation of JP 2001-348276, Umiga et al. Dec. 2001.*
Sep. 14, 2016 First office action K-03058-DE-NP.

*Primary Examiner* — David Sample
(74) *Attorney, Agent, or Firm* — Larry R. Meenan

(57) ABSTRACT

In order to provide a sintered, hexagonal boron nitride body (2a, 2b), same is produced by at least one pressing process and subsequent sintering process from a powder (P) made of a hexagonal boron nitride, its density being deliberately set to a value of <1.6 g/cm³. Studies have shown that, due to the selection of this lower density, the boron nitride body (2a, 2b) exhibits very high isotropy, when compared with conventional hexagonal boron nitride bodies. This relates in particular to thermal conductivity and the coefficient of thermal expansion, which are also largely temperature-independent.

11 Claims, 2 Drawing Sheets

(51) Int. Cl.
*C04B 35/583* (2006.01)
*B32B 3/12* (2006.01)
*B32B 7/00* (2006.01)
*B32B 7/02* (2006.01)
*B32B 9/00* (2006.01)
*B32B 9/04* (2006.01)
*B32B 19/00* (2006.01)
*B32B 19/04* (2006.01)
*B32B 3/00* (2006.01)

(56) References Cited

U.S. PATENT DOCUMENTS

| | | | |
|---|---|---|---|
| 3,720,740 | A | 3/1973 | Muta et al. |
| 3,837,997 | A | 9/1974 | Economy et al. |
| 4,045,186 | A | 8/1977 | Corrigan |
| 4,885,264 | A | 12/1989 | Sindlhauser et al. |
| 5,019,539 | A | 5/1991 | Claar et al. |
| 5,296,419 | A | 3/1994 | White et al. |
| 5,330,937 | A | 7/1994 | Ellison-Hayashi et al. |
| 5,629,186 | A | 5/1997 | Yasukawa et al. |
| 5,908,795 | A | 6/1999 | Nishio et al. |
| 6,764,975 | B1 * | 7/2004 | Clere .................. C01B 21/0648 423/290 |

* cited by examiner

SINTERED BORON NITRIDE BODY AND METHOD FOR PRODUCING A SINTERED BORON NITRIDE BODY

CLAIM TO PRIORITY

This application claims priority from German Application No. 102013224308.1 filed Nov. 27, 2013, the entire contents of which is incorporated herein by reference.

BACKGROUND OF THE INVENTION

The invention relates to a sintered boron nitride body and a method for producing same, wherein the boron nitride body is produced for this purpose by at least one pressing process and a subsequent sintering process from a powder made of a hexagonal boron nitride.

Overall, such a boron nitride body made of hexagonal boron nitride (H-BN) has a graphite-like structure and is white in color. In contrast thereto, sintered bodies made of cubic boron nitride (CBN) exhibit greater hardness and are black in color. The latter are used, for example, as cutting materials.

Boron nitride bodies made of hexagonal boron nitride (H-BN) are utilized, for example, for electric insulators, for melting molds for metal melts, for furnace components and as substrates for growing crystals. Due to the use of the hexagonal boron nitride, such bodies have a crystal structure that is formed from layers composed of a planar, hexagonal honeycomb structure. Because of this graphite-like structure, built up from individual planar layers, such boron nitride bodies made of hexagonal boron nitride exhibit strong anisotropy with regard to at least some physical properties, in particular with regard to thermal conductivity or the coefficient of thermal expansion. The properties differ widely depending on the directions in space of perpendicular or parallel to the layers. For instance, thermal conductivity in the direction parallel to the layers, the so-called a-direction, is typically nearly twice as high as in the direction perpendicular thereto. This direction is called the c-direction. This anisotropy can be attributed to the different binding forces between atoms within the individual layers on the one hand and between the layers on the other hand. Depending on the orientation of the body, the properties of such a sintered boron nitride body made of hexagonal boron nitride therefore exhibit strong directional dependence.

For producing such a boron nitride body, the powder is usually pressed to form a cold-pressed molded body, also called a green body, in a first cold-pressing process. The powder used consists to at least virtually 100% of hexagonal boron nitride. Typically, small portions of boron oxide are present, for example in the range of between 1.5 and 2% by weight. The powder usually does not contain any further constituents. This cold-pressed green molded body is a body of low strength. Cold-pressing is carried out without external heat supply, in particular isostatically at a pressing pressure of between 900·10$^5$ and 2000·10$^5$ Pa. The cold-pressed molded body is subsequently subjected to a second process, namely a hot-pressing process. This is carried out at temperatures of typically 1200 to 1500 degrees, causing the obtained boron oxide to fuse and thus serving as a binder. During hot-pressing, the molded body is maximally compacted to form a hot-pressed molded body. Following hot-pressing, additional sintering is carried out, which is also called a tempering process. Temperatures of about 1800° typically prevail, at which the boron oxide evaporates.

The sintered boron nitride body obtained after the sintering process may subsequently still be mechanically processed in order to obtain the desired final geometric shape. Conventional sintered boron nitride bodies typically have a density of about 1.9 g/cm$^3$.

The high anisotropy is generally considered to be undesirable in such boron nitride bodies. For example, thermal conductivity in a conventional boron nitride body is about 80 W/mK in the c-direction in space and about 130 W/mK in the a-direction in space. Consequently, there is a large difference in thermal conductivity of more than 40 W/mK (at room temperature).

Another problem is the temperature dependence of the thermal conductivity. For instance, in conventional sintered boron nitride bodies, thermal conductivity shows very strong temperature dependence. The thermal conductivity for the c-direction in space, starting from a room temperature to a service temperature in the range of 1000° C., drops to below half and to nearly a third, for example. The strong anisotropy of the thermal conductivity, as well as its strong temperature dependence, therefore pose problems for the user who employs such sintered boron nitride bodies. During temperature changes, for example during heating or also in defined temperature profiles that are run, a person skilled in the art must take a strongly varying thermal conductivity into account. As indicated at the outset, such sintered boron nitride bodies are also used, for example, for molds in metal casting or also in melting furnaces. For such applications, however, knowledge of the thermal conductivity at a given temperature is of crucial importance in order to be able to control the production process, for example a casting process, as effectively as possible.

Finally, the strong anisotropy also poses problems with regard to the coefficient of thermal expansion. Because of the strong anisotropy, it is imperative that care be taken that the boron nitride bodies be used exactly in the defined orientation.

PROBLEM TO BE ADDRESSED BY THE INVENTION

Proceeding from the above, the problem to be addressed by the invention is that of providing a sintered boron nitride body having improved properties.

SOLUTION TO THE PROBLEM

The problem is solved according to the invention by a sintered boron nitride body that is produced by at least one pressing process and a subsequent sintering process from a powder made of a hexagonal boron nitride, the sintered boron nitride body having a density of <1.6 g/cm$^3$.

In comparison with known sintered boron nitride bodies made of hexagonal boron nitride, the boron nitride body according to the invention is therefore characterized by a significantly lower density. Studies have shown that this lower density is associated with a clearly improved isotropy of the body with regard to essential properties, such as thermal conductivity or the coefficient of thermal expansion. The boron nitride body is therefore isotropic, i.e., its properties are—at least within certain tolerances—directionally independent.

During the production process, the crystals in question of the crystalline starting powder usually orient themselves along a preferred direction, so the entire body is characterized by two directions in space, namely the a-direction that is parallel to the layers and the c-direction that is perpendicular to the layers. The layers are typically oriented perpendicular to a direction of pressing. As a first direction in space, the manufactured boron nitride body therefore has the c-direction, which is oriented parallel to a direction of pressing during the production process. As a second direction in space, oriented perpendicular thereto, it has the a-direction. Hence, the latter is oriented parallel to the layers of the hexagonal boron nitride. The sintered, final manufactured boron nitride body therefore preferably has an at least largely identical isotropy in the direction of these two directions in space. In comparison with conventional sintered, hexagonal boron nitride bodies of high density, the properties of the sintered boron nitride body of low density exhibit significantly smaller differences in terms of direction-dependence, in particular with regard to thermal conductivity. "Largely isotropic" is therefore understood to mean a significantly improved isotropy as compared with conventional sintered boron nitride bodies.

A further major advantage of the lower density is that, during the sintering process, a reliable discharge of the binder present in the starting powder, in particular boron oxide, is ensured, specifically also from deeper material layers. As explained at the outset, the boron oxide evaporates at the sintering temperatures of about 1800° C. and thus escapes from the body. Hence, this reliably ensures a boron oxide-free sintered boron nitride body. This is required in particular for such areas of application in which such high temperatures may also be achieved during normal use. In such applications, a discharge of boron oxide would lead to unwanted contaminations. A qualitatively high-value hexagonal boron nitride body should therefore be free of boron oxides.

In an expedient design, the finished sintered boron nitride body has a thermal conductivity that differs by less than 15 W/mK for different directions in space at a defined temperature.

According to a preferred design, the boron nitride body furthermore has a coefficient of thermal expansion that differs by less than $0.25*10^{-6}$/K for different directions in space at a given temperature, in particular of 1200° C. At a temperature of 1200° C., a conventional boron nitride body has a coefficient of thermal expansion of 1.6 W/K in the first, c-direction in space and a coefficient of thermal expansion of $0.4*10^{-6}$/K in the second, a-direction in space. In terms of absolute values, the differences are therefore $1.2*10^{-6}$/K.

In an expedient design, the properties are also largely independent of temperature; they are therefore preferably largely constant over a temperature range from room temperature up to, for example, 1000° or even 1200°, in comparison with conventional boron nitride bodies of high density. With regard to thermal conductivity, "largely constant" is understood to mean that the value for thermal conductivity has a maximum deviation of +/−10 W/mK from a mean value over the entire temperature range. Also with regard to the coefficient of thermal expansion, this is understood to mean that the maximum deviation from a mean value is only $+/-0.15*10^{-6}$/K.

The absolute values for the thermal conductivity preferably lie in the range of about 20 to 35 W/mK. The values for the coefficient of thermal expansion preferably lie in the range of 0.15 to $0.40*10^{-6}$/K.

According to a first variation of an embodiment, during production, the powder is subjected to a two-step pressing process, namely a cold-pressing process and a downstream hot-pressing process, wherein a defined density is set in the range of 1.2 g/cm³ to 1.6 g/cm³ and preferably up to maximally 1.5 g/cm³. In the hot-pressing process, the maximum density is in particular set by a path control. The hot-pressing process is therefore terminated after a given compression path. The hot-pressing process is typically carried out at temperatures in the range of 1000° C. to 1500° C. The maximum pressure is determined by the desired density to be achieved. At the end of the hot-pressing process, said density is preferably about 0.1 to 0.3 g/cm³, in particular 0.2 g/cm³ greater than the desired density of the final sintered boron nitride body, depending on how high the proportion of components is that evaporates during sintering. The reason for this is that, during the subsequent sintering or tempering process, which is preferably carried out at temperatures in the range of 1500° C. to 2000° C. and in particular of about 1800° C., any boron oxide still remaining in the body evaporates. The mass decreases while the volume remains constant, resulting in an overall decrease in density.

According to an alternative embodiment, the hot-pressing process is dispensed with during production, and only the cold-pressing process with down-stream sintering process is carried out. Such sintered boron nitride bodies will expediently have a density in the range of 0.9 to 1.2 g/cm³. Surprisingly, this measure therefore provides a boron nitride body suitable for the areas of application that consists of hexagonal boron nitride of extremely low density as compared with conventional boron nitride bodies. During cold-pressing, before the subsequent sintering process, a density is set here as well that is greater by a range of 0.1 to 0.3 g/cm³, in particular about 0.2 g/cm³, than the targeted final density of the cold-pressed and sintered boron nitride body, depending on the proportion of volatile components, in particular boron oxide.

Surprisingly, a relatively high-value sintered boron nitride body is likewise produced using such a body that has only been cold-pressed. Because the cold-pressed (green) molded bodies typically still have very low strength, they can usually not be sintered or only with great difficulty without, for example, the formation of cracks or the like. However, studies have now shown that, due to the low density of the cold-pressed molded body as well, no problems associated with crack formation occur in an immediately following sintering process. This also makes it possible to produce larger, in particular thicker, sintered boron nitride bodies.

Expediently, the final manufactured sintered boron nitride body, in particular for both variations of the embodiment, accordingly also has a thickness of >30 mm and in particular also of >40 mm. Perpendicular to the orientation in the direction of thickness, the body, in an expedient design, furthermore has a surface area of at least several tens of cm². The finished sintered boron nitride bodies are usually plate-shaped or also cylindrical/disk-shaped bodies, which may still be transformed into a desired final geometry by mechanical means, such as sawing etc.

With the exception of the mentioned mechanical processing steps, the boron nitride body is preferably not subjected to any further treatment after the sintering process. The boron nitride body obtained after the sintering process is a monolithic body.

The problem is furthermore solved according to the invention by a method for producing such a sintered boron nitride body having the features described herein. Preferred designs and refinements can be found in the subclaims. The advantages described with regard to the boron nitride body and preferred designs apply analogously also to the method.

For the production, a hexagonal boron nitride powder is first cold-pressed for creating a (green) molded body, the molded body being sintered in a further method step for forming the boron nitride body, the density of the sintered boron nitride body being specifically set to a value of <1.6 g/cm³, in particular <1.5 g/cm³.

A density in the range of 1 g/cm³ to 1.3 g/cm³ is expediently set for the cold-pressed molded body. According to a first preferred alternative, the cold-pressing process is still followed by a hot-pressing process, in which the molded body is further compacted. The hot-pressing process is carried out at temperatures of between 1000° C. and 1500° C. In the process, a binder constituent present in the powder, in particular boron oxide, which is preferably present in the powder at a proportion of 1 to 2% by weight, liquefies.

Expediently, in this hot-pressing process, the hot-pressed molded body is specifically set to a density that is about 0.1 to 0.3 g/cm³, and in particular about 0.2 g/cm³ greater than the desired density of the final sintered boron nitride body. Setting the density is expediently path-controlled. Hot-pressing is therefore terminated before the hot-pressed molded body reaches a maximum possible density.

According to a preferred alternative, the actual sintering process is carried out immediately after cold-pressing, hence, without a further hot-pressing process.

Expediently, the cold-pressing is an isostatic cold-pressing. Except for the minor amounts of boron oxide contained in the powder, this cold-pressing is carried out without any further binder. Through isostatic pressing, a design of the cold-pressed molded body that is as isotropic as possible is achieved. In contrast, hot-pressing is preferably carried out as a uniaxial hot-pressing. The initially cold-pressed molded body is thus compressed along a defined direction in space. This direction in space at the same time defines the above-mentioned first, parallel direction in space (c-direction), which is oriented perpendicular to the crystal layers. In the uniaxial hot-pressing process, said layers orient themselves completely perpendicular to the direction of pressing.

In addition to this combination of isostatic cold-pressing and uniaxial hot-pressing, a uniaxial cold-pressing and/or an isostatic hot-pressing is also made possible in principle.

DESCRIPTION OF THE FIGURES

Embodiments of the invention are explained in more detail below with reference to the figures.

DESCRIPTION OF THE EMBODIMENT

Figure 1:
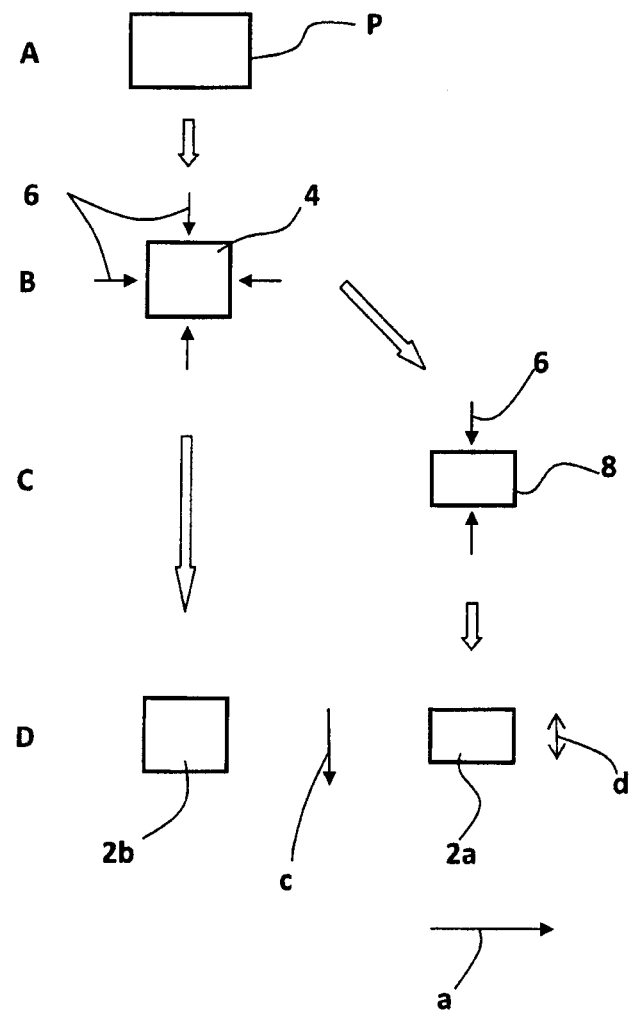
FIG. 1 shows schematically the course of the production process in two different alternatives and FIG. 2 shows a measurement diagram of the temperature dependence of the thermal conductivity of a boron nitride body according to the invention, in comparison with a conventional boron nitride body.

For producing a sintered boron nitride body 2a, b made of nearly 100% hexagonal boron nitride, a powder P, the individual powder particles of which are composed of hexagonal boron nitride, is first provided in a method step A. In addition to the crystalline, hexagonal boron nitride particles, the powder P also contains a small proportion of boron oxide. Typically, this proportion lies in the range of 1 to 5, in particular to 2% by weight. Aside from the boron nitride, the powder P does not contain any further constituents.

In method step B, this powder is introduced into a press mold and subjected to an isostatic cold-pressing, so that a cold-pressed molded body 4 is subsequently obtained. In this isostatic pressing, a compaction pressure is exerted from all sides on the molded body 4 to be formed, as shown by the arrows 6. In this cold-pressing process, the cold-pressed molded body 4 is compacted to a density in the range of about 1 to 1.3 g/cm³.

In the first variation of the method, a hot-pressing is subsequently still carried out in method step C, in which the cold-pressed molded body 4 is uniaxially subjected to a further pressing process at a temperature of about 1200° C. to 1500° C. The exerted pressing force is again shown by the arrows 6. In this pressing process, the result is a hot-pressed molded body 8. In the hot-pressing process, said body is set to a density that is typically about 0.2 g/cm³ greater than the desired final density of the sintered boron nitride body 2a. A density in the range of 1.4 to 1.7 g/cm³ is therefore typically set for the hot-pressed molded body 8. Finally, in the subsequent method step D, the actual sintering or tempering process takes place. The sintering process is typically carried out at about 1700° C. to 2000° C., in particular at about 1800° C. in an inert atmosphere, particularly in a nitrogen atmosphere. The dwell time is several hours, preferably about 3 to 5, and in particular 4 hours.

At the temperatures of the hot-pressing process, the boron oxide present is only fused, and thus active as a binder, in order to form a hot-pressed molded body 8 of high strength. At the higher sintering temperatures, the still remaining boron oxide evaporates, and the individual boron nitride particles sinter together. Due to the evaporation of the boron oxide, the density of the final manufactured boron nitride body 2a is reduced to a density in the range of 1.2 to 1.5 g/cm³, depending on the setting in the hot-pressing process.

In the second method alternative, hot-pressing according to method step C is dispensed with, and the cold-pressed molded body 4 is directly subjected to a sintering process D in order to create the sintered boron nitride body 2b. Same accordingly again has a significantly lower density in the range of about 1 g/cm³ to 1.2 g/cm³, in particular 1 g/cm³, compared with the sintered hot-pressed boron nitride body 2a.

The final manufactured boron nitride bodies 2a, 2b each have a thickness d, which is preferably >30 mm and in particular >40 mm.

The boron nitride bodies 2a, 2b produced in this way have very high isotropy, particularly with regard to thermal conductivity and the coefficient of thermal expansion. A distinction is made between a first, parallel direction in space, the c-direction, and a second direction, perpendicular thereto, the a-direction. The parallel c-direction in space is oriented parallel to the direction of pressing in the uniaxial hot pressing according to method step C.

In general, these two directions in space a, c are two directions in space that are perpendicular to one another along main axes of the sintered boron nitride body 2a, 2b.

Figure 2:
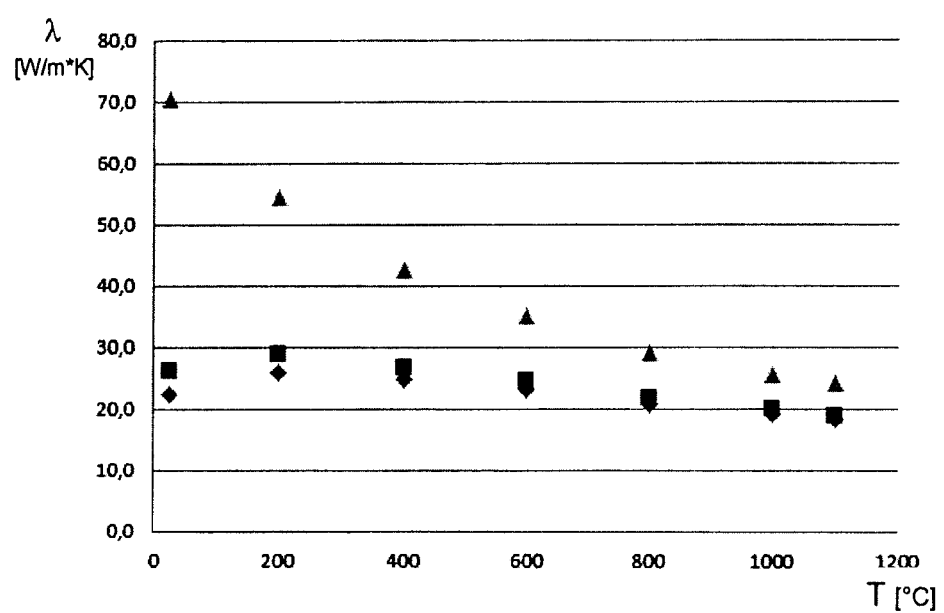

The diagram according to FIG. 2 shows the temperature dependence of the thermal conductivity $\lambda$ of a hot-pressed boron nitride body 2a according to the invention having a density of 1.5 g/cm³ in comparison with a conventionally manufactured boron nitride body of high density. The thermal conductivity $\lambda$ is plotted in W/mK against the temperature. The measuring points marked as triangles are the measuring points of a conventional boron nitride body, in fact, in the c-direction in space. The measuring points marked with a diamond are the measuring points of a boron nitride body 2a of low density according to the invention, likewise in the c-direction in space. The measuring points marked with a square are the measuring points for a boron nitride body 2a according to the invention in the a-direction.

Based on the values of a conventional boron nitride body, it is apparent first that they are heavily temperature-dependent and drop from an initial value of about 70 W/mK at room temperature to a value of about 25 W/mK at a temperature of about 1100° C. In contrast, the values for both directions in space a, c in the boron nitride body 2a according to the invention are largely constant. They fluctuate only slightly around a mean value of about 25 W/mK over the entire temperature range from about room temperature to about 1100° C.

It is furthermore readily apparent that the values for the two directions in space a, c are virtually indistinguishable or differ only slightly; hence, that the boron nitride body 2a has very high isotropy with regard to its thermal conductivity. The thermal conductivity is therefore largely independent of the orientation of the boron nitride body 2a.

It further apparent that, although the values of the thermal conductivity of the body 2a according to the invention at room temperature lie significantly below those of a conventional boron nitride body, the values nearly approximate them with increasing temperature due to a sharp drop in the temperatures of the conventional sintered bodies and already lie very close together in the range of a later area of application, for example in a temperature range greater than 800° C. Surprisingly, the lower density of the boron nitride body 2a according to the invention therefore simply does not lead to lower thermal conductivities at the later application temperatures.

Similarly, the boron nitride body 2a also exhibits very high isotropy with regard to the coefficient of thermal expansion which is likewise, similar to the thermal conductivity, substantially independent of the respective temperature.

The following table additionally lists several further properties of a conventional sintered boron nitride body as a comparative sample and those of a boron nitride body 2a according to the invention.

| Properties | Comparative sample | | BN body 2a | |
|---|---|---|---|---|
| Direction in space | c (parallel) | a (perpendicular) | c (parallel) | a (perpendicular) |
| Density (g/cm$^3$) | | 1.90 | | 1.50 |
| Thermal conductivity at 25° C. (W/mK) | 78.00 | 130.00 | 25.00 | 32.00 |
| Coefficient of thermal expansion at 1200° C. (10$^{-6}$/K) | 1.60 | 0.40 | 0.20 | 0.35 |
| Specific heat at 25° C. (J/(g*K)) | | 0.81 | | 0.90 |
| Max. temp. inert | | 2000 | | 2000 |

The two boron nitride bodies are self-binding systems, to which no additional binder had thus been added. The binder functionality is assumed by the boron oxide that is usually still contained in the starting powder as a contamination, so to speak, in an amount of 1 to 2% by weight. The characteristic color of such hexagonal boron nitride bodies is white. The density of the comparative sample according to the prior art was 1.9 g/cm$^3$, whereas the density of the boron nitride body 2a according to the invention was 1.5 g/cm$^3$.

The thermal conductivity at 25° C. shows strong anisotropy in the comparative sample and is 78 W/mK for the parallel c-direction in space and 130 W/mK for the perpendicular a-direction in space. In contrast, the values for the boron nitride body 2a according to the invention differ by only 7 W/mK. As previously explained in connection with FIG. 2, while the values at 25° C. lie clearly below those of the conventional boron nitride body, they become increasingly similar at higher temperatures.

With respect to the coefficient of thermal expansion, measured at 1200° C., the anisotropy is even more pronounced in the comparative sample and differs by factor of 4. For the parallel c-direction in space it is $1.6*10^{-6}$/K, and for the perpendicular a-direction in space it is $0.4*10^{-6}$/K. In contrast, the boron nitride body 2a according to the invention shows an absolute difference of only $0.15 \cdot 10^{-6}$/K. Here as well, the coefficient of thermal expansion thus shows very high isotropy when compared with the conventional comparative sample. Moreover, the boron nitride body 2a according to the invention is also characterized by a significantly lower coefficient of thermal expansion—at least with respect to the parallel c-direction in space—, which is lower than that of the comparative sample by about a factor of 8. The specific heat for the two boron nitride bodies is roughly comparable. The same is also true for the maximum service temperature in inert ambient conditions, hence, under a protective gas atmosphere/nitrogen atmosphere, for example.

Studies have furthermore shown that the boron nitride body according to the invention also exhibits adequate electrical breakdown strength.

In summary, it should therefore be noted that it is possible to achieve particularly advantageous physical properties by specifically setting only a low density for the sintered boron nitride body 2a, 2b. In particular, this results in high isotropy. This relates to thermal conductivity and also to the coefficient of thermal expansion. In addition to high isotropy, the boron nitride body 2a, 2b is moreover characterized by being substantially temperature-independent, in particular with regard to thermal conductivity, over a temperature range from room temperature to temperatures greater than 1000° C. Overall, compared with a conventional hexagonal boron nitride body, a significantly improved, evenly built up, isotropic hexagonal boron nitride body 2a, 2b is achieved, whose possible uses are considerably more flexible for the most varied areas of application, due to this improved isotropy.

What is claimed is:

1. A sintered boron nitride body, produced by at least one pressing process and a subsequent sintering process from a powder comprising a hexagonal boron nitride powder, and wherein said sintered boron nitride body comprising a density of less than 1.6 g/cm$^3$ and a thermal conductivity in a first direction in space that differs by less than 15 W/mK from the thermal conductivity in a second direction in space.

2. The sintered boron nitride body according to claim 1 wherein the sintered boron nitride body having a crystal structure comprising layers of a planar, honeycomb structure hexagonal boron nitride, and the sintered boron nitride body being isotropic with regard to the first direction in space and the second direction in space wherein the first direction in space is oriented perpendicular to the layers of hexagonal boron nitride and the second direction in space is oriented parallel to the layers of hexagonal boron nitride.

3. The sintered boron nitride body according to claim 2 wherein the sintered boron nitride body has a coefficient of thermal expansion in the first direction that differs by less than $0.25*10^{-6}$ K from the coefficient of thermal expansion in the second direction.

4. The sintered boron nitride body according to claim 2 wherein the sintered boron nitride body has a thermal conductivity having a maximum deviation of +/−10 W/mK over a temperature range from room temperature to about 1000° C.

5. The sintered boron nitride body according to claim 1 wherein the sintered boron nitride body has a thickness of greater than 30 mm and an area equal to at least least 30 cm².

6. The sintered boron nitride body according to claim 5 wherein the sintered boron nitride body has a thickness of greater than 40 mm.

7. The sintered boron nitride body of claim 1, wherein the sintered boron nitride body has a thermal conductivity of 20 W/mK to 35 W/mK in the a-direction and c-direction.

8. A sintered boron nitride body, produced by at least one pressing process and a subsequent sintering process from a powder comprising a hexagonal boron nitride powder, and wherein said sintered boron nitride body comprising a density of 0.9 g/cm³ to 1.2 g/cm³ and has a coefficient of thermal expansion in a first direction that differs by less than $0.25*10^{-6}$ K from the coefficient of thermal expansion in a second direction.

9. A sintered boron nitride body, produced by at least one pressing process and a subsequent sintering process from a powder comprising a hexagonal boron nitride powder, and wherein said sintered boron nitride body comprising a density of 0.9 g/cm³ to 1.2 g/cm³ and has a thermal conductivity having a maximum deviation of +/−10 W/mK over a temperature range from room temperature to about 1000° C.

10. A sintered boron nitride body, produced by at least one pressing process and a subsequent sintering process from a powder comprising a hexagonal boron nitride powder, and wherein said sintered boron nitride body comprising a density of 0.9 g/cm³ to 1.2 g/cm³ and has a thermal conductivity of 20 W/mK to 35 W/mK in the a-direction and c-direction.

11. A sintered boron nitride body, produced by at least one pressing process and a subsequent sintering process from a powder comprising a hexagonal boron nitride powder, and wherein said sintered boron nitride body comprising a density of 0.9 g/cm³ to 1.2 g/cm³ and has a thermal conductivity in the first direction that differs by less than 15 W/mK from the thermal conductivity in the second direction.

* * * * *